May 4, 1954 R. C. JAYE 2,677,747
APPARATUS FOR SHAPING CELLULAR PLASTIC MATERIAL
Filed Feb. 20, 1953 2 Sheets-Sheet 1
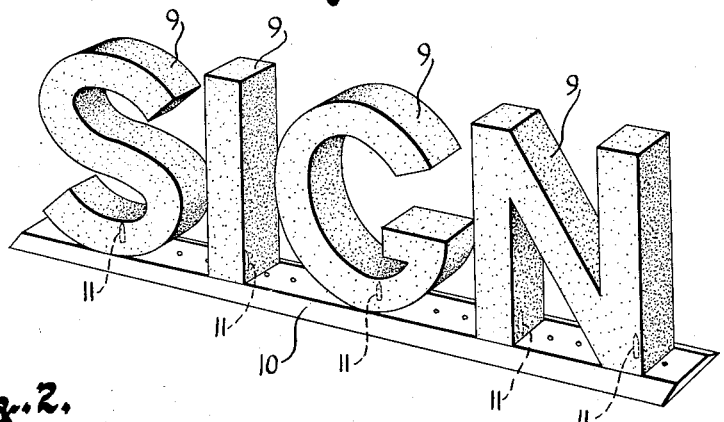
Fig. 1.
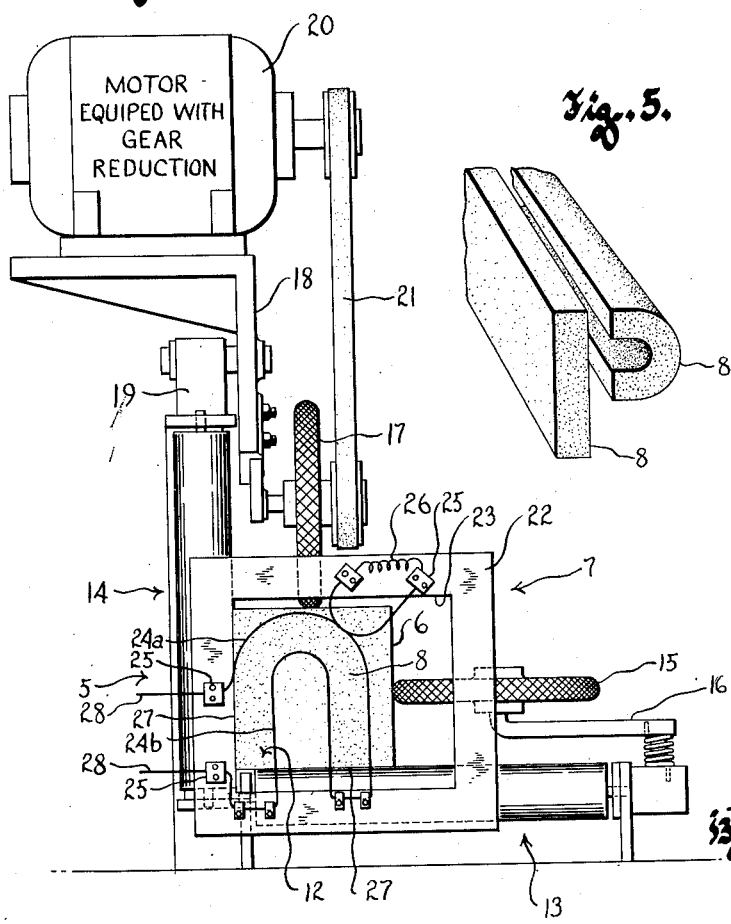
Fig. 2.
Fig. 3.

May 4, 1954 R. C. JAYE 2,677,747
APPARATUS FOR SHAPING CELLULAR PLASTIC MATERIAL
Filed Feb. 20, 1953 2 Sheets-Sheet 2
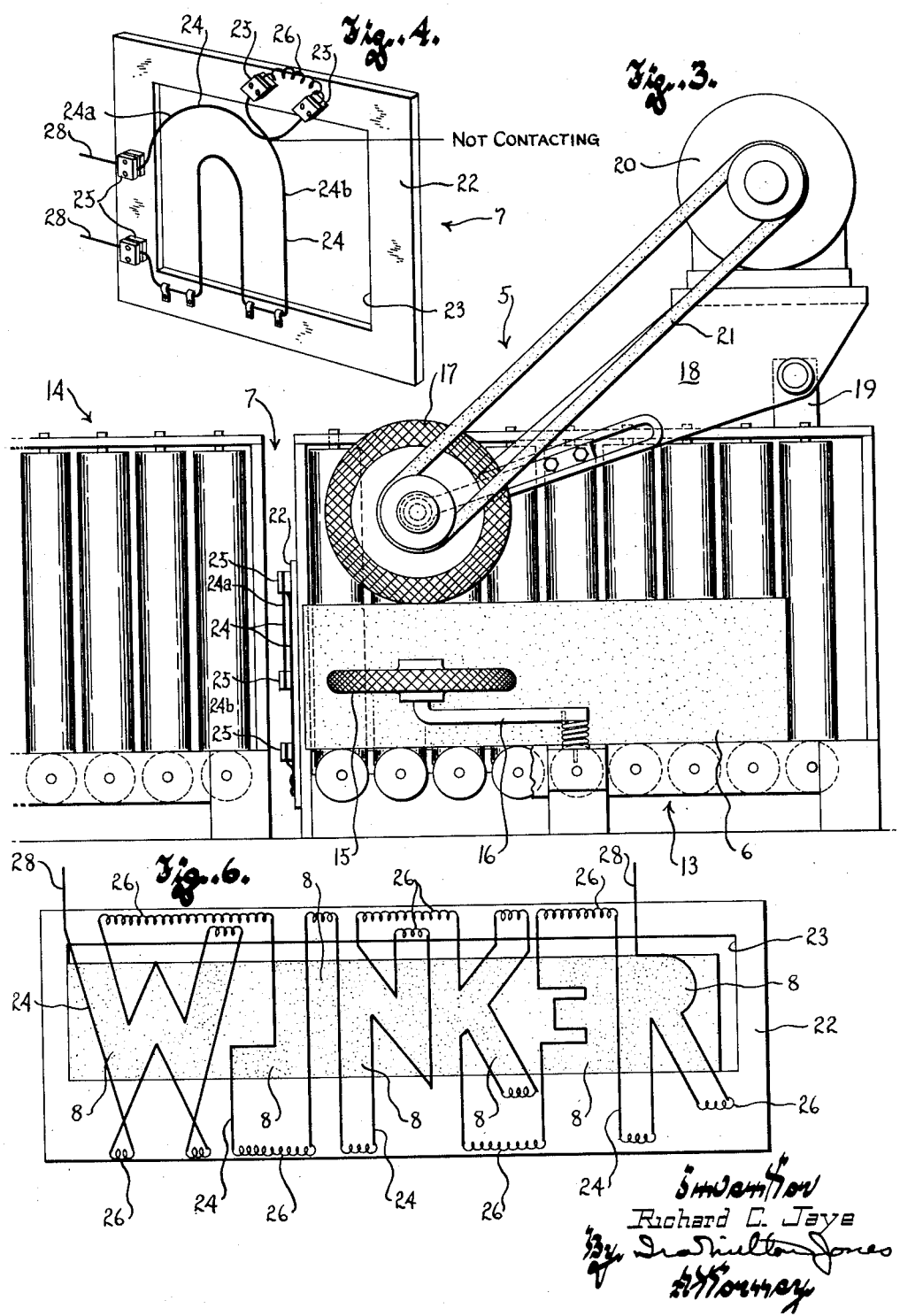

Patented May 4, 1954

2,677,747

UNITED STATES PATENT OFFICE 2,677,747

APPARATUS FOR SHAPING CELLULAR PLASTIC MATERIAL

Richard C. Jaye, Watertown, Wis.

Application February 20, 1953, Serial No. 337,967

2 Claims. (Cl. 219—19)

This invention relates generally to the shaping or cutting of cellular plastic material of the type sold under the trade name "Styrofoam," and is more particularly concerned with apparatus for shaping or cutting such material into relatively long bars having a desired uniform cross section throughout their length.

Cellular plastic material in the nature of styrene foam lends itself nicely to employment in advertising display devices and particularly to the letter elements of advertising display signs.

Heretofore in fabricating letter elements and other configurations for advertising displays and the like from Styrofoam, it has been customary to cut the desired shapes out of a relatively thick sheet of material, using either a bandsaw or a hot wire as a cutting tool. This procedure necessitated the fabrication of each letter or character individually and was a tedious and very expensive job since, in effect, each letter element had to be custom-made. By contrast, it is an object of this invention to provide apparatus for fabricating cellular plastic material in such a manner that a large number of letter elements or other characters having a desired configuration may be produced in a relatively short time.

More specifically, it is an object of this invention to provide apparatus for the production of elongated bars of cellular plastic material, which bars have a desired uniform cross sectional profile throughout their length and may therefore be sliced transversely to their length, much the same as a loaf of bread is sliced, to provide a large number of substantially identical letter elements, each having a configuration corresponding to the cross section of the bar.

Still another object of this invention resides in the provision of simple and efficient apparatus for shaping or cutting relatively long bars of cellular plastic material or the like into a desired uniform cross sectional profile throughout their entire length, and in which apparatus the bars of material to be shaped are mechanically propelled past the cutting element.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 1 is a perspective view of an advertising display sign fashioned from letter elements produced using the apparatus of this invention;

Figure 2 is a front elevational view of the apparatus of this invention;

Figure 3 is a side elevational view thereof;

Figure 4 is an enlarged perspective view of the cutting station of the apparatus of Figures 2 and 3;

Figure 5 is a fragmentary perspective view of two bars produced by means of the apparatus of this invention showing the same in relative position to be assembled into a unitary bar having a cross section corresponding to the letter "P"; and Figure 6 is a more or less diagrammatic front view of a modified embodiment of the cutting station of the apparatus showing how a number of letter elements may be simultaneously cut from a slab of cellular plastic material with a minimum waste.

Referring now more particularly to the accompanying drawings in which like numerals designate like parts throughout the several views, the numeral 5 designates generally a machine or apparatus embodying the principles of this invention, in which an elongated block 6 of styrene foam material known as "Styrofoam" or the like may be propelled past a cutting station, designated generally by 7, at which the block is shaped to form it into a bar 8 having a uniform cross sectional profile along its length. The bar so formed may subsequently be sliced transversely to its length, in much the same manner that a loaf of bread is sliced, to thus provide a number of individual letter elements 9 which may be combined to form an attractive sign. These letter elements may be secured to a base 10 in any suitable manner as, for example, by impalement upon pointed pegs 11 projecting upwardly from the base, or they may be employed as described in my aforesaid copending application.

A trough 12 provides a guideway to guide the blocks of "Styrofoam" or the like to be shaped, straight through and past the cutting station. This trough comprises a horizontal base 13 upon which the block rides and a vertical fence 14, both of which consist essentially of closely spaced rollers freely rotatably mounted in suitable frames which are interrupted to accommodate the cutting station. The trough thus provides right angularly disposed tracks adapted to engage a pair of adjacent faces of a block being moved therealong, it being understood that the block preferably is rectangular in cross section.

The blocks of material to be shaped may be advanced along the trough and through the cutting station either manually or mechanically, and in either case a guide wheel 15, freely rotatably journaled on a pivoted spring pressed arm 16, urges the block sideways towards and against the fence 14.

Mechanical propulsion of the block toward and through the cutting station may be effected by a drive wheel 17 which bears down on the block and thus coacts with the guide wheel 15 to hold the block in the trough. The drive wheel is freely rotatably journaled upon the outer end of an arm 18 which is pivotally mounted on the fence 14 by means of a bracket 19 so that the guide wheel is free to swing toward and from the base. An electric motor 20 having a gear reduction built into it is also mounted on the arm 18 and is drivingly connected with the wheel 17 by a belt 21. Proper traction between the drive wheel and a block of material to be propelled through the cutting station is assured by having the motor so positioned that its center of gravity lies between the pivot axis of the arm and the drive wheel. The weight thus imposed upon the block should not, however, be so great as to preclude slippage of the drive wheel in the event normal advance of the block is for some reason not possible.

The cutting station comprises an upright frame 22 of insulating material defining an opening 23 large enough to permit the block to pass lengthwise therethrough. This frame is firmly mounted between the two endwise spaced sections of the trough 12 and has one or more cutting elements 24 attached thereto as at 25. The portions of these wires which are disposed in the opening 23 lie in the path of a block being fed through the cutting station, substantially in a plane normal to said path, and by virtue of their heated condition maintained by the passage of an electric current therethrough cut the block into bars or strips having a cross section determined by the shape of the wires within the opening of the frame.

Though the wires, which are preferably of Nichrome, are relatively stiff and thus quite capable of resisting deformation by the pressure exerted thereon as the block is pressed thereagainst, long unsupported spans should be avoided, and accordingly the wires, though preferably presenting one continuous electric circuit, are brought out to the frame and supported at intervals as shown in Figure 4. Thus, as here shown, where the bar is being given a U-shaped cross section, the outer edge or periphery of the U is cut by two sections or lengths of hot wire 24a and 24b each supported at its ends with their adjacent end portions overlapping one another for a short distance so as to assure continuity for the curvature of the U. It is important, however, that the overlapping portions of the wires do not touch within the frame but continue beyond the edge of the opening 23 in the frame to thus assure against the possibility of a cold wire lying in the path of the block.

Stated in another way, every portion or section of the hot wire cutting element must lie completely across some portion of the path of the block, and consequently it is not feasible to use the apparatus of this invention to form letters or figures having closed loops (such as A, P, D, etc.) in one operation. Such letters are formed, as shown in Figure 5, from two bar elements which are cemented or otherwise joined together to provide the effect of a unitary bar having the desired profile.

As indicated hereinbefore all of the hot wire cutting elements are preferably connected into one continuous electric circuit and to achieve this result the ends of the several cutting elements or sections thereof are connected, beyond the boundaries of the opening 23, by loops or jumpers 26.

Whenever possible the flat faces of the block are used to form straight portions of the letter elements, as at 27 (Figure 2), and where it is possible to use relatively wide blocks or slabs, a number of bars may be shaped simultaneously by arranging several hot wire cutting elements at the cutting station, as shown more or less diagrammatically in Figure 6. In each instance, of course, each cutting element extends completely across the path of the block, as hereinbefore described, and the several elements are electrically connected with one another by jumpers or loops 26.

The attachment of the cutting elements to the insulated frame is not shown in Figure 6, but will be understood to be like the attachments 25 shown particularly in Figure 4. It will also be understood that since the frame is of insulating material, the attachments of the wires thereto may be located wherever needed to produce any desired shape and afford maximum rigidity for the wires by reducing the length of their spans; and that in practice the ends of the series connected cutting elements have leads by which the cutting elements are connectible across a suitable source of electric current.

From the foregoing description taken together with the accompanying drawings it will be apparent that this invention provides a simple and efficient apparatus for shaping relatively long blocks of cellular plastic material into bars having a uniform cross sectional shape along their length and which bars may be readily sliced transversely to form attractive letter elements.

What I claim as my invention is:

1. Apparatus for shaping an elongated block of cellular thermoplastic material or the like to any desired cross sectional shape which is uniform along the length of the block, comprising: support means defining a cutting station past which a block may pass lengthwise; means for supporting a block and guiding it for lengthwise motion along a defined path past said cutting station; a hot wire cutting element mounted on said support means, and comprising a plurality of sections of electrical resistance wire, each of which has its end portions outside the path of the block to be cut and firmly attached to the support means, and its medial portion disposed in said path and shaped to form part of the desired cross sectional shape to be produced; means connected to the ends of the sections for connecting all of them across a source of electric current; all of said sections lying in planes substantially normal to said defined path; and certain adjacent sections having portions thereof overlapping so that the part of the cross sectional shape formed by one section is continued by the adjacent section, but the overlapping portions of said adjacent sections being spaced from one another in the direction of movement of the block to be cut so that their end portions by which they are attached to the support means are not shunted out of circuit.

2. The hereindescribed method of making a closed loop letter element of cellular plastic material, which comprises the steps of: moving a block of said material in a straight line across a hot wire shaped to produce the cross sectional configuration of a portion of the letter element to be made to thereby form an elongated bar having a uniform cross sectional shape corresponding to that of a portion of the letter element to be made; similarly moving a block of said material across a hot wire shaped to produce the cross sectional configuration of another portion of the letter element to be made to thereby form an elongated bar having a uniform cross sectional shape corresponding to that of said other portion of the letter element to be made; joining said bars to produce a composite bar having the cross sectional shape of the letter element to be made; and slicing said composite bar transversely into letter elements of the desired thickness.

References Cited in the file of this patent

UNITED STATES PATENTS

| Number | Name | Date |
|---|---|---|
| 1,378,721 | Rohdiek | May 17, 1921 |
| 2,234,129 | Pfeil | Mar. 4, 1941 |
| 2,255,709 | MacDonnell | Sept. 9, 1941 |
| 2,577,745 | Foster | Dec. 11, 1951 |